United States Patent
Chen et al.

(10) Patent No.: US 11,685,668 B2
(45) Date of Patent: Jun. 27, 2023

(54) MANGANESE-DOPED NICKEL MOLYBDATE ELECTRODE MATERIAL AND METHODS FOR PREPARING THE SAME

(71) Applicant: Changzhou University, Changzhou (CN)

(72) Inventors: Haiqun Chen, Changzhou (CN); Qun Chen, Changzhou (CN); Guangyu He, Changzhou (CN); Junwu Zhu, Changzhou (CN); Xiaowei Yang, Changzhou (CN); Yongsheng Fu, Changzhou (CN); Weidong Chen, Changzhou (CN); Hanming Wang, Changzhou (CN); Dachuan Yao, Changzhou (CN); Yitao Zhao, Changzhou (CN); Jingjing Yuan, Changzhou (CN); Ling Jiang, Changzhou (CN); Qingli Hao, Changzhou (CN)

(73) Assignee: Changzhou University, Changzhou (CN)

( * ) Notice: Subject to any disclaimer, the term of this patent is extended or adjusted under 35 U.S.C. 154(b) by 515 days.

(21) Appl. No.: 16/838,044

(22) Filed: Apr. 2, 2020

(65) Prior Publication Data
US 2021/0147249 A1    May 20, 2021

(30) Foreign Application Priority Data
Nov. 19, 2019  (CN) .......................... 201911134758.3

(51) Int. Cl.
*C01G 53/00*   (2006.01)
*H01M 4/505*   (2010.01)
*H01M 4/525*   (2010.01)

(52) U.S. Cl.
CPC ............. *C01G 53/00* (2013.01); *C01G 53/40* (2013.01); *H01M 4/505* (2013.01); *H01M 4/525* (2013.01); *C01P 2002/52* (2013.01); *C01P 2002/72* (2013.01); *C01P 2006/40* (2013.01); *Y02E 60/10* (2013.01)

(58) Field of Classification Search
None
See application file for complete search history.

(56) References Cited

PUBLICATIONS

Li et al. Manganese-doped nickel molybdate nanostructures for high-performance asymmetric supercapacitors. Chemical Engineering Journal, 372, 452-461 (Year: 2019).*
Yuan et al. Mn-Doped NiMoO4 Mesoporous Nanorods/Reduced Graphene Oxide Composite for High-Performance All-Solid-State Supercapacitor.ACS Appl. Engery Mater. 3, 1974-1803 (Year: 2020).*

* cited by examiner

*Primary Examiner* — Tanisha Diggs
(74) *Attorney, Agent, or Firm* — Idea Intellectual Limited; Margaret A. Burke; Sam T. Yip

(57) ABSTRACT

The present invention provides a method for producing a manganese-doped nickel molybdate electrode material including mixing a nickel salt solution with a manganese salt solution to form a mixture; adding a molybdate solution into the mixture and being subject to a thermal reaction; and obtaining the manganese-doped nickel molybdate electrode material after washing and drying of the reaction product. The nickel salt includes one or more of nickel nitrate, nickel chloride, and nickel acetate; the manganese salt includes one or more of manganese chloride, manganese nitrate, and manganese sulfate; and the molybdate includes one or more of sodium molybdate or ammonium molybdate. The present method utilizes a single reaction to produce a Mn-doped $NiMoO_4$ electrode material, which does not require using nickel molybdate as an intermediate product. The method simplifies the preparation process and makes it easy to be adjusted, thereby improving the electrochemical properties of the electrode material.

11 Claims, 4 Drawing Sheets

MANGANESE-DOPED NICKEL MOLYBDATE ELECTRODE MATERIAL AND METHODS FOR PREPARING THE SAME

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims priority to China Patent Application No. 2019111347583, filed Nov. 19, 2019, and the disclosures of which is incorporated herein by reference in its entirety.

FIELD OF THE INVENTION

The present invention relates generally to the technical field of electrode material. More specifically, it relates to a manganese-doped nickel molybdate electrode material and a method of producing the same.

BACKGROUND

The characteristics of nickel molybdate material are low capacitance, poor charge-discharge performance, and the stability of the material is lower than other similar electrochemical materials. The existing nickel molybdate and its modified materials have limited capacity to improve the capacity of nickel molybdate, and cannot be gently charged and discharged to fully improve the electrochemical properties of the nickel molybdate material.

SUMMARY OF THE INVENTION

This section aims to summarize some aspects of the embodiments of the present invention and to briefly describe some preferred embodiments. Simplification or omission may be made in this section, the abstract of the specification, and the title to avoid obscuring the purposes of this section, the abstract of the specification, and the title. Such simplification or omission may not be used to limit the scope of the present invention.

The present invention is made in view of the technical problems as above-mentioned.

Therefore, as one aspect of the present invention, there is provided a manganese-doped nickel molybdate electrode material and a method of producing the same to overcome the technical hurdles in the conventional technologies. In one embodiment, the method includes mixing a nickel salt solution with a manganese salt solution to form a mixture; adding a molybdate solution into the mixture and being subject to a thermal reaction; and obtaining the manganese-doped nickel molybdate electrode material after washing and drying of the reaction product. The nickel salt includes one or more of nickel nitrate, nickel chloride, and nickel acetate; the manganese salt includes one or more of manganese chloride, manganese nitrate, and manganese sulfate; and the molybdate includes one or more of sodium molybdate or ammonium molybdate. The present method utilizes a single reaction to produce a Mn-doped $NiMoO_4$ electrode material, which does not require using nickel molybdate as an intermediate product.

In one embodiment, a molar ratio of solutes in the nickel salt solution to the manganese salt solution is 1:6-18; a molar ratio of solutes in the molybdate solution to the mixture of the nickel salt solution and the manganese salt solution is 1:0.6-1.5.

In another embodiment, the nickel salt solution and the manganese salt solution have a concentration of 0.01-0.04 mol/L; the molybdate solution has a concentration of 0.01-0.04 mol/L.

In other embodiment, the manganese-doped nickel molybdate electrode material can be represented by the following formula:

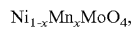

$$Ni_{1-x}Mn_xMoO_4,$$

where x is a positive number less than 1.

To solve the technical problems as above-mentioned, the present invention provides the following solutions: the present invention provides manganese-doping on the nickel molybdate, which allows the electrode be gently charged and discharged through manganese, thereby improving the electrochemical properties of the nickel molybdate electrode material.

DETAILED DESCRIPTION

Example 1

Equal volumes of 0.036 mol/L nickel nitrate solution and 0.004 mol/L manganese chloride solution were mixed thoroughly to form a mixture, followed by adding the same volume of 0.04 mol/L sodium molybdate as the above mixture and transferring thereof into a reactor (the inner lining is Teflon). Reaction temperature was set at 165° C.; reaction time was 9 hours. Next, the reaction product was washed with water for three times, and then dried in a vacuum drying chamber for 12 hours to obtain a Mn-doped $NiMoO_4$ electrode material.

Figure 1:
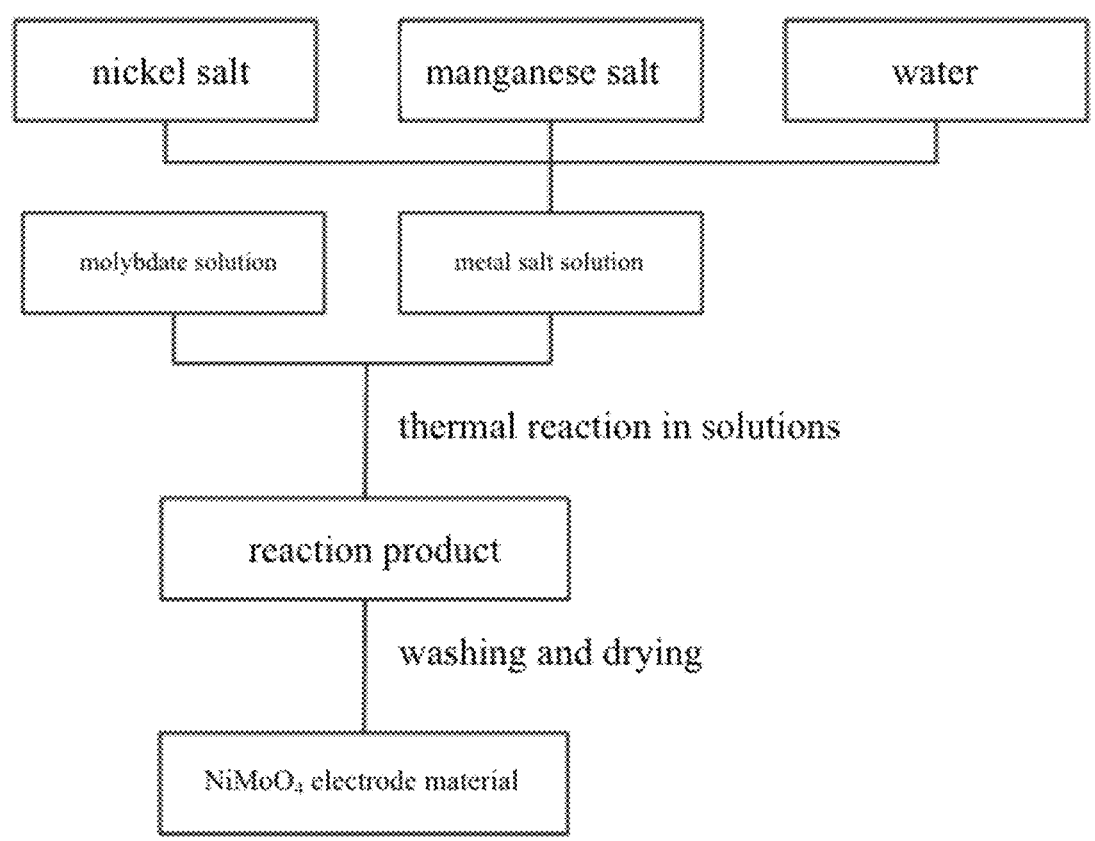
FIG. 1 depicts a flow chat of the overall process of the methods for producing the manganese-doped nickel molybdate electrode material.
Figure 2:
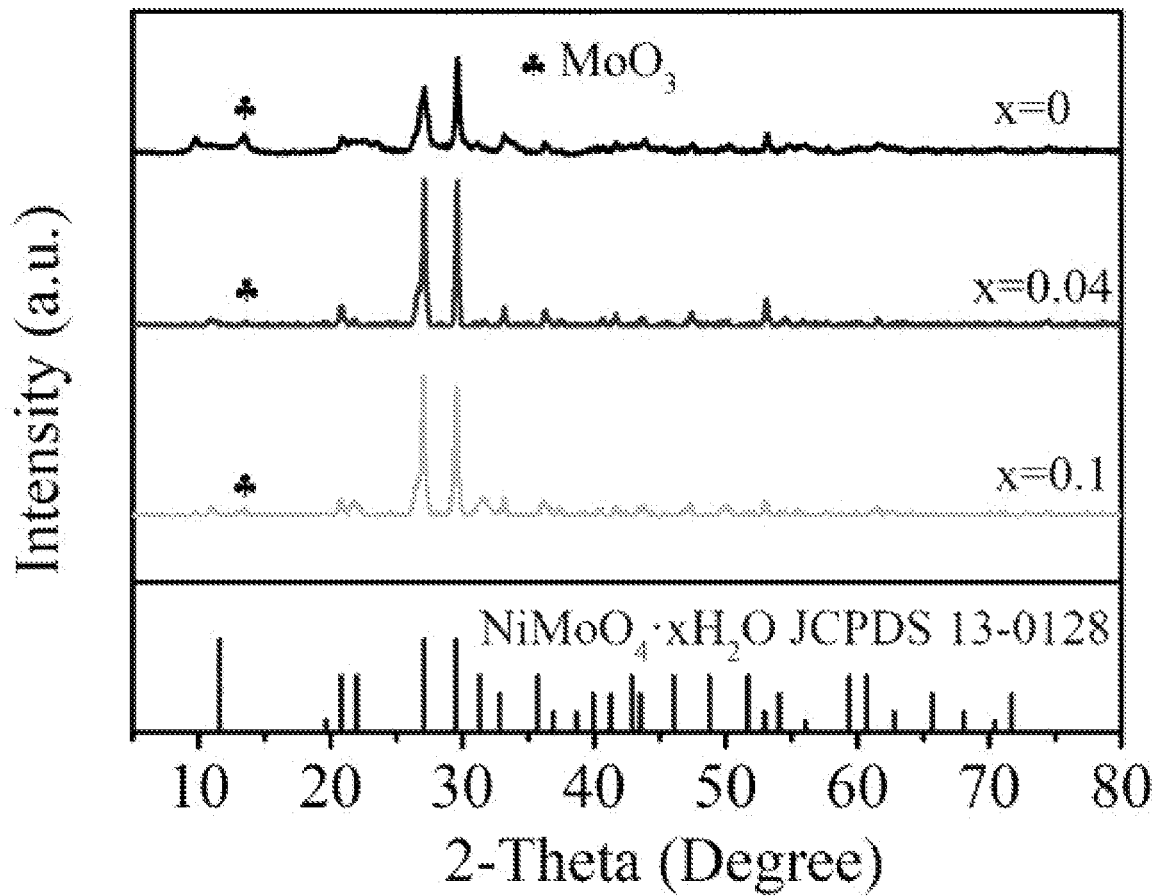
FIG. 2 depicts the XRD result of the manganese-doped nickel molybdate electrode material prepared according to Example 1.

The specific capacitance of the Mn-doped $NiMoO_4$ electrode material was determined to reach 935.8 F/g under a current density of 0.5 A/g, which significantly improves its performance compared to traditional $NiMoO_4$ materials. Adding Mn would lead to more variations during the redox reaction. Mn has more valence, so more redox reactions would be performed. Meanwhile, XRD result (FIG. 2) showed that the characteristic peaks appearing in the material correspond to the standard card of $NiMoO_4$ (PDF #13-0128). However, all peaks were slightly shifted toward the low angle diffraction because of the doping of Mn. In addition, no peaks of other substances appeared in the prepared electrode material. About more than 90% mole fraction of Mn was combined with other elements to form a composite during the process of reaction, and the content of manganese in the solution is very low.

Table 1 shows EDS analysis results of the manganese-doped nickel molybdate electrode material prepared according to Example 1:

| Element | wt. % | Atomic % |
|---|---|---|
| O | 30.86 | 68.31 |
| Mn | 2.00 | 1.29 |
| Ni | 23.96 | 14.46 |
| Mo | 43.18 | 15.94 |
| Total | 100.00 | 100.00 |

There are many factors that affect the entry of Mn into the material, including ion concentration, temperature, reaction time, etc. Among these factors, the most important factor that affects the entry of Mn into the material may be the ion concentration. When the concentration of $Mn^{2+}$ ions is too high, additional $MnMoO_4$ would be generated.

Figure 3:
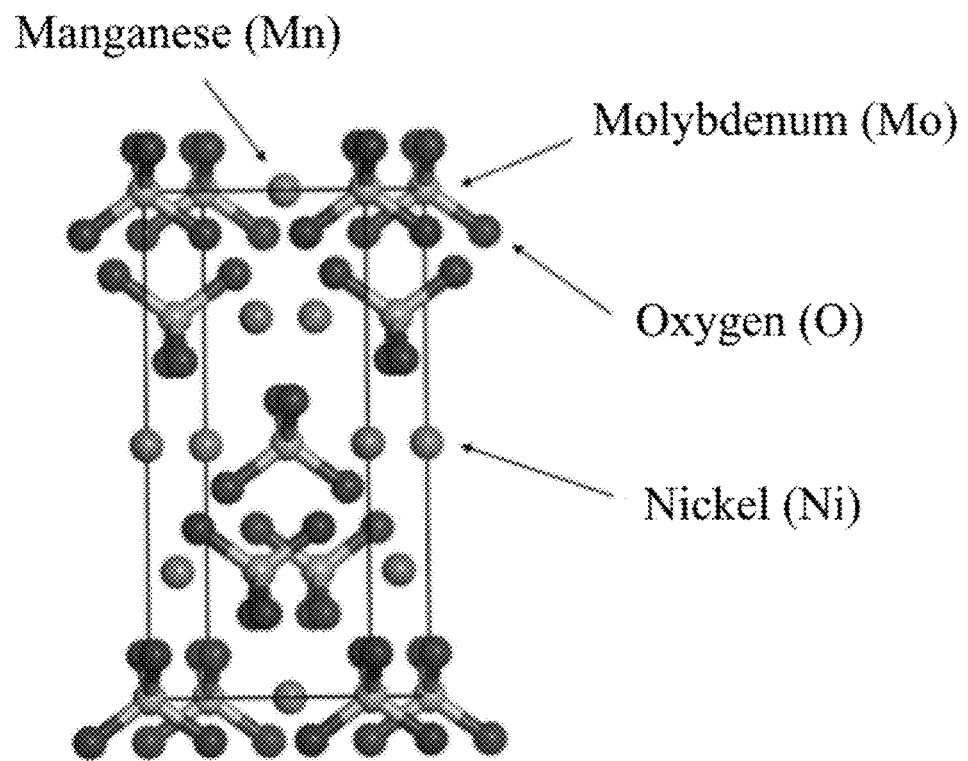
FIG. 3 depicts a unit cell of the manganese-doped nickel molybdate electrode material prepared according to Example 1.
Figure 4:
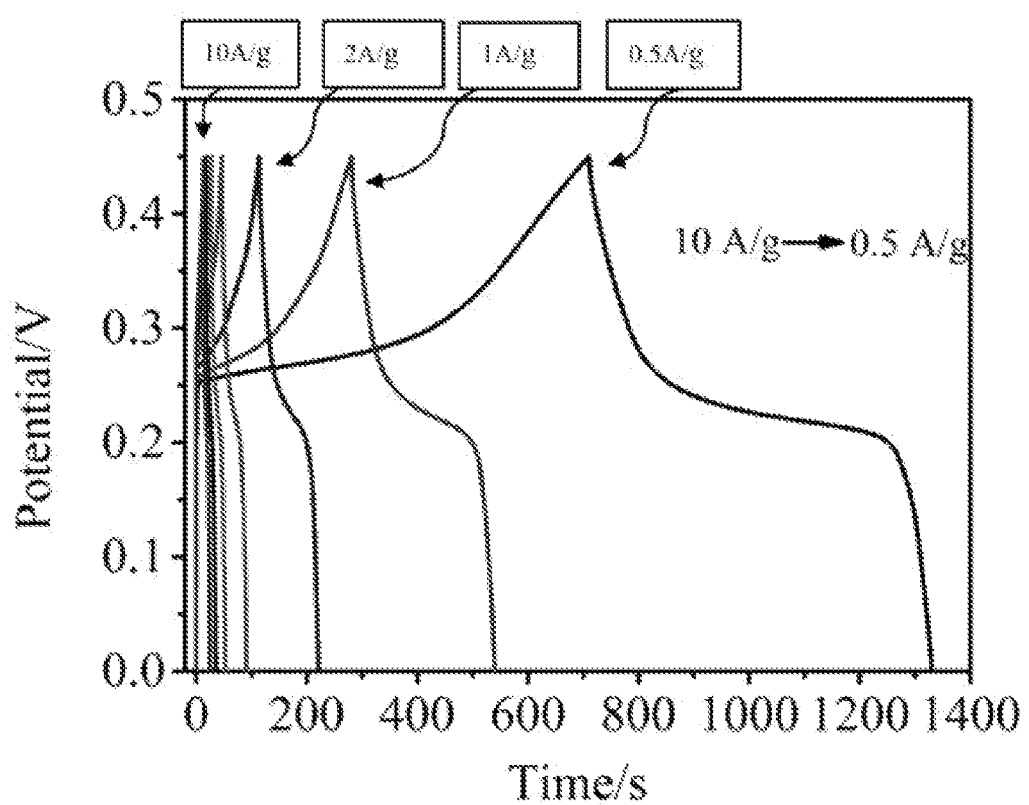
FIG. 4 depicts a comparison chart of the manganese-doped nickel molybdate electrode material under different current densities.

After Mn being doped into the material, it could be seen from the actual unit cell (as shown in FIG. 3) that Mn and Ni were in the same position. Such material was not a conventional $MnMoO_4$—$NiMoO_4$ composite material. The electrochemical properties of the materials were much better at a current density of 0.5 A/g, which was not only representative, but it also made the process of the electrochemical reaction more efficient and complete under a lower current density. FIG. 4 shows the situation under other current density conditions. In addition, in the present invention, the materials are prepared by solvothermal synthesis method instead of in-situ synthesis method, and then the prepared samples were directly coated on the surfaces of nickel foams in the subsequent step. Such method could increase the loading of the material on the nickel foams compared with in-situ synthesis on the surfaces of nickel foams. When performing the electrochemical test, the prepared material needs to be coated on the surface of the nickel foams, which functions as a current collector. For example, if a small piece of nickel foam is placed in an autoclave, the material could also grow on the surface of the nickel foam in the process of producing the material, that is, hydrothermal processes, However, the loading was only about 1-2 mg. The present invention is therefore to prepare the material first, followed by applying the coating method, thereby making the loading reach 3-5 mg, and the material does not fall off easily.

Example 2

Equal volumes of 0.0018 mol/L nickel acetate solution and 0.0282 mol/L manganese sulfate solution were mixed thoroughly, followed by adding the same volume of 0.03 mol/L ammonium molybdate as the above mixture and transferring thereof into a reactor (the inner lining is Teflon). Reaction temperature was set at 155° C.; reaction time was 10 hours. Next, the reaction product was washed with water for three times, and then dried at 60° C. in a vacuum drying chamber for 12 hours to obtain a Mn-doped $NiMoO_4$ electrode material.

The specific capacitance of the $NiMoO_4$ electrode material was determined to be about 862.1 F/g under a current density of 0.5 A/g. Meanwhile, XRD result showed that the characteristic peaks appearing in the material correspond to the standard card of $NiMoO_4$ (PDF #13-0128). However, all peaks were slightly shifted toward the low angle diffraction because of the doping of Mn. In addition, no peaks of other substances appeared in the prepared electrode material. About 97% mole fraction of Mn was combined with other elements to form a composite during the process of reaction, and the content of manganese in the solution was very low. Mn, which acted as a doping element, was located at the original position where Ni was located in the unit cell.

Mn, which acted as a doping element, was located in the original position where Ni was located in the unit cell. The unit cells of nickel molybdate and manganese molybdate were similar so that when the amount of Mn is less, Mn and Ni are situated in the same position in the unit cell, that is, part of Ni is replaced by Mn in the $NiMoO_4$ unit cell. About 97% of Mn was composited into the material, and EDS analysis result (Table 1) also support such point.

Example 3

0.01 mol/L sodium molybdate was added into an equal volume of 0.01 mol/L nickel nitrate solution followed by mixing them thoroughly to form a mixture, and transferring the mixture into a reactor (the inner lining is Teflon). Reaction temperature was set at 165° C.; reaction time was 9 hours. Next, the reaction product was washed with water for three times, and then dried in a vacuum drying chamber for 12 hours to obtain a $NiMoO_4$ electrode material.

The specific capacitance of the $NiMoO_4$ electrode material was determined to reach 425.7 F/g under a current density of 0.5 A/g. Meanwhile, XRD result showed that the characteristic peaks appearing in the material correspond to the standard card of $NiMoO_4$ (PDF #13-0128).

Example 4

Equal volumes of 0.02 mol/L nickel nitrate solution and 0.02 mol/L manganese chloride solution were mixed thoroughly to form a mixture, followed by adding the same volume of 0.003 mol/L sodium molybdate as the above mixture and transferring thereof into a reactor (the inner lining is Teflon). Reaction temperature was set at 165° C.; reaction time was 9 hours. Next, the reaction product was washed with water for three times, and then dried in a vacuum drying chamber for 12 hours to obtain a Mn-doped $NiMoO_4$ electrode material.

The specific capacitance of the Mn-doped $NiMoO_4$ electrode material was determined to reach 523.7 F/g under a current density of 0.5 A/g, which only slightly improves its performance compared to traditional $NiMoO_4$ materials. Meanwhile, XRD result showed that although the characteristic peaks appearing in the material correspond to the standard card of $NiMoO_4$ (PDF #13-0128), there were Mn-containing heterogeneous peaks detected in the sample because the material is doped with a large amount of Mn and the effect of anions on the material. Therefore, it is believed that nickel salt, manganese salt and molybdate are not theoretically combined with each other to form Mn-doped $NiMoO_4$ during the process of production, but an additional side reaction has happened to generate a small amount of $MoO_3$ impurities, thereby affecting the electrochemical properties of the material.

Example 5

Equal volumes of 0.4 mol/L nickel nitrate solution and 0.6 mol/L manganese chloride solution were mixed thoroughly to form a mixture, followed by adding the same volume of 1 mol/L sodium molybdate as the above mixture and transferring thereof into a reactor (the inner lining is Teflon). The set temperature of the reaction was 175° C., and the heating time was 9 hours. Next, the reaction product was washed with water for three times, and then dried in a vacuum drying chamber for 12 hours to obtain a Mn-doped $NiMoO_4$ electrode material.

The specific capacitance of the Mn-doped $NiMoO_4$ electrode material was determined to reach 477.8 F/g under a current density of 0.5 A/g, which does not improve its performance compared to traditional $NiMoO_4$ materials. Meanwhile, XRD result showed that the characteristic peaks appearing in the material correspond to the standard card of $NiMoO_4$ (PDF #13-0128) and $MnMoO_4$ (PDF #15-0791), respectively. However, the two constituents could not form a better heterostructure and exert a better synergistic effect, so the improvement in performance of the material is limited.

Example 6

Equal volumes of 0.0018 mol/L nickel acetate solution and 0.0282 mol/L manganese sulfate solution were mixed thoroughly to form a mixture, followed by adding the same volume of 0.03 mol/L ammonium molybdate as the above mixture and transferring thereof into a reactor (the inner lining is Teflon). Reaction temperature was at 110° C.; reaction time was 15 hours. Next, the reaction product was washed with water for three times, and then dried at 60° C. in a vacuum drying chamber for 12 hours to obtain a Mn-doped $NiMoO_4$ electrode material.

The specific capacitance of the $NiMoO_4$ electrode material was determined to reach 423.9 F/g under a current density of 1.5 A/g. Meanwhile, XRD result showed that the characteristic peaks appearing in the material correspond to the standard card of $NiMoO_4$ (PDF #13-0128). However, all peaks were slightly shifted toward the low angle diffraction because of the doping of Mn. About 70% mole fraction of Mn was combined with other elements to form a composite during the process of reaction, where Mn acted as a doping element and was located at the original position where Ni was located in the unit cell.

The present method performs a single reaction to produce a Mn-doped $NiMoO_4$ electrode material, thereby simplifying the process of production, making the process of production easy to be adjusted, and improving productivity. In addition, it is possible to effectively avoid excess reactants and improve the purity of the reaction product by controlling the concentration of molybdate to be consistent with the total metal ions concentration in the metal salt solution.

What is claimed is:

1. A method for producing a manganese-doped nickel molybdate electrode material, comprising:
   mixing a nickel salt solution with a manganese salt solution to form a mixture;
   adding a molybdate solution into the mixture and being subject to a thermal reaction to yield a reaction product;
   obtaining a manganese-doped nickel molybdate electrode material after washing and drying of the reaction product;
   wherein a molar ratio of solutes in the nickel salt solution to the manganese salt solution is 1:6-18; a molar ratio of solutes in the molybdate solution to the mixture of the nickel salt solution and the manganese salt solution is 1:0.6-1.5.

2. The method according to claim 1, wherein the nickel salt comprises one or more of nickel nitrate, nickel chloride, and/or nickel acetate; the manganese salt comprises one or more of manganese chloride, manganese nitrate, and/or manganese sulfate; and the molybdate comprises one or more of sodium molybdate and/or ammonium molybdate.

3. The method according to claim 1, wherein the nickel salt is nickel nitrate; the manganese salt is manganese nitrate; and the molybdate is sodium molybdate.

4. The method according to claim 1, wherein a molar ratio of solutes in the nickel salt solution to the manganese salt solution is 1:9-15; a molar ratio of solutes in the molybdate solution to the mixture of the nickel salt solution and the manganese salt solution is 1:0.9-1.2.

5. The method according to claim 2, wherein a molar ratio of solutes in the nickel salt solution to the manganese salt solution is 1:9-15; a molar ratio of solutes in the molybdate solution to the mixture of the nickel salt solution and the manganese salt solution is 1:0.9-1.2.

6. The method according to claim 3, wherein a molar ratio of solutes in the nickel salt solution to the manganese salt solution is 1:9-15; a molar ratio of solutes in the molybdate solution to the mixture of the nickel salt solution and the manganese salt solution is 1:0.9-1.2.

7. The method according to claim 1, wherein the nickel salt solution and the manganese salt solution have a concentration of 0.01-0.04 mol/L; the molybdate solution has a concentration of 0.01-0.04 mol/L.

8. The method according to claim 2, wherein the nickel salt solution and the manganese salt solution have a concentration of 0.01-0.04 mol/L; the molybdate solution has a concentration of 0.01-0.04 mol/L.

9. The method according to claim 3, wherein the nickel salt solution and the manganese salt solution have a concentration of 0.01-0.04 mol/L; the molybdate solution has a concentration of 0.01-0.04 mol/L.

10. The method according to claim 1, wherein the thermal reaction has a reaction temperature of 140-180° C., and a reaction time thereof is from 8 to 12 hours.

11. The method according to claim 1, wherein the thermal reaction has a reaction temperature of 150-170° C., and a reaction time thereof is from 8 to 10 hours.

* * * * *